March 3, 1964 P. JEAN-BAPTISTE ASTIER 3,123,289

TAPE PUNCHING DEVICE

Filed Nov. 14, 1960 7 Sheets-Sheet 1

INVENTOR

PIERRE JEAN-BAPTISTE ASTIER

BY Karl W. Flocks

ATTORNEY

March 3, 1964 P. JEAN-BAPTISTE ASTIER 3,123,289

TAPE PUNCHING DEVICE

Filed Nov. 14, 1960 7 Sheets-Sheet 2

INVENTOR

Pierre Jean-Baptiste Astier

BY KARL W. FLOCKS

ATTORNEY

INVENTOR
Pierre Jean-Baptiste Astier
BY KARL W. FLOCKS
ATTORNEY

INVENTOR
Pierre Jean-Baptiste Astier
BY KARL W. FLOCKS
ATTORNEY

March 3, 1964 P. JEAN-BAPTISTE ASTIER 3,123,289

TAPE PUNCHING DEVICE

Filed Nov. 14, 1960 7 Sheets-Sheet 5

INVENTOR

PIERRE JEAN-BAPTISTE ASTIER

BY Karl W. Flocks

ATTORNEY

INVENTOR
PIERRE JEAN-BAPTISTE ASTIER
BY Karl W. Flocks
ATTORNEY

March 3, 1964 P. JEAN-BAPTISTE ASTIER 3,123,289

TAPE PUNCHING DEVICE

Filed Nov. 14, 1960 7 Sheets-Sheet 7

INVENTOR
PIERRE JEAN-BAPTISTE ASTIER

BY Karl W. Flocks
ATTORNEY

United States Patent Office 3,123,289
Patented Mar. 3, 1964

3,123,289
TAPE PUNCHING DEVICE

Pierre Jean-Baptiste Astier, 4 Rue Eugene Jumin, Paris 19, France

Filed Nov. 14, 1960, Ser. No. 69,116
Claims priority, application France Nov. 14, 1959
3 Claims. (Cl. 234—103)

The present invention relates to an improved device for punching paper tapes according to a special code, these tapes being adapted in particular for the remote control of composing machines.

More specifically, the invention provides a punching device independent of a composing machine. Independent punching devices are already known, and comprise a keyboard of the type to be found on a typewriter. This enforces a special adaptation by a Linotype operator to said keyboard; moreover, it is very difficult for someone who is used to an ordinary typewriter keyboard to adapt to typographical usage without having preliminary training.

According to the present invention, the keys of the keyboard used for punching are arranged and mounted in the same way as the keys of the keyboard of a composing machine of the "Linotype" type.

In applying a "Linotype" type of keyboard, the difficulty to be overcome for forming the various perforations is to obtain a machine having a keyboard which has sufficiently sensitive keys and a very rapid response time.

The present invention provides a keyboard of the "Linotype" type which is suitably sensitive and supple and which has a very quick response time of between three milliseconds and one-thirtieth of a second.

In accordance with a specific feature, each key of the keyboard corresponds to one or more electric contacts through a cam of special profile enabling, whatever the pressure exerted on the key, a constant contact time to be obtained for the electric contact or contacts, as well as a predetermined pressure thereon, these electric contacts being connected to the punching device proper.

A normal keyboard for a "Linotype" machine comprises keys each cooperating with a cam rotatable by the keyboard roller with which a "Linotype" machine is usually provided. Each of these cams normally cooperates with rods controlling the escapement of the matrices.

According to one of the main features of the present invention, the cams have a special profile; they still cooperate with a rod, but this rod, instead of acting as in the case of a normal "Linotype" machine, on the matrix escapement device, operates, according to one specific embodiment of the invention, on an electric contact in a circuit feeding at least one electromagnet, this electromagnet actuating, in a very particular way, one or more punches adapted to perforate the paper tape according to a code corresponding to the sign of each key of the keyboard which is depressed.

For each revolution of the cams, a special electric contact has to be provided for the punching, as well as a special contact for the "counting." It is to be noted that the present invention is not concerned with this "counting," but solely relates to the punching. In any case, the electric contacts have to operate simultaneously in a very short and constant period of time, to enable the punching tool as well as the "counting" device to perform their cycle, while permitting the operator to go through his text at high speed. Originally, the profile of the cams in the normal "Linotype" machines was designed in such a way that the period for release of the matrix escapements would be sufficiently long to allow each matrix sufficient time to be released; the composing rate therefore depends on the interval of time between starting off each cam on its revolution, the unhooking and release cycle of each matrix being substantially constant and sufficiently long to have no influence on the composing speed, since the start of each cycle corresponds to the instant of commanding the release of each matrix. The cam cycles can thus be dephased while occurring simultaneously without any inconvenience when passing from one sign to another.

In other words, the conventional cam for a "Linotype" keyboard is designed to furnish a working time for the escapement of the escapement devices of the matrices sufficiently long to enable a matrix to escape from the escapement device and, aided by its own weight, to accelerate from zero. The average time taken for all of the members in the matrices is, in present "Linotype" machines, of the order of 1/10 of a second.

The aim sought by the applicant is to obtain an electric signal of between 3 milliseconds and 1/30 of a second duration. The period of 3 milliseconds is a minimum for enabling sufficient time for the group of relays to act and the period of 1/30 of a second is a maximum corresponding to the maximum composition speed humanly possible.

The applicant has advantageously settled on a response time of 1/100 of a second.

As regards the punching, all interference must be obviated and the perforator (and "counter") control cycles must be completely finished when the operator passes from one sign to another. This is the reason why the cycle must be of very short duration.

According to a further feature, the punching system proper comprises the following parts in combination:

A set of punches (or any similar perforation means) adapted for the perforation of a paper tape;

An electromagnet provided for each punch;

An additional electromagnet for advancing the paper tape;

A special electrical circuit adapted to obtain a perfect synchronisation between advance and perforation;

A device for guiding the tape.

According to a specific embodiment, each punch is connected to the plunger of its electromagnet through a tumbler and a swivel rod.

The electromagnets are distributed substantially in a circle and the punches are located at the central portion of this unit.

Further advantages and features of the present invention will become clear from the following description given in connection with the accompanying drawings, in which.

Figure 1:
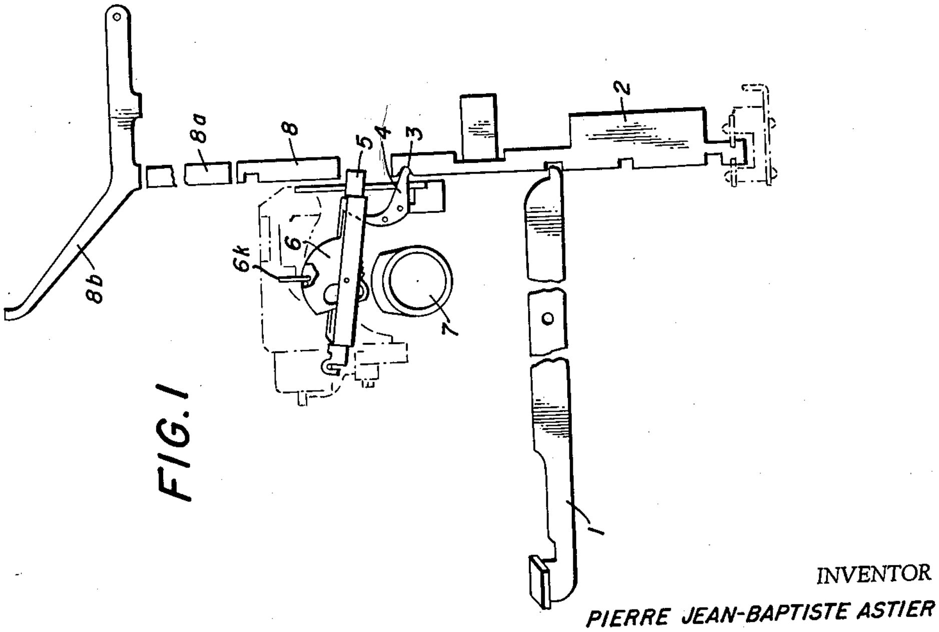
FIGURE 1 is a diagrammatic view of a conventional unit: key+matrix escapement device by cam.

Referring to these drawings, there will be seen in FIGURE 1 an explanatory diagram of the action of one key of the escapement device of the matrices, in accordance with the normal operation of a machine of the "Linotype" type. When the operator depresses a key 1, a counterweight 2 is raised and acts, by means of a bank 3 provided on the upper portion thereof, on a trigger 4 which co-operates with a cam yoke 5 on which is mounted an idle cam 6 of the conventional type.

The cam 6 is rotatable by a roller 7. The yoke 5 is also associated with a rod 8 which acts, in turn, on the escapement device of the matrices through linkage 8*a*—8*b*. The applicant does not intend to describe here the operation of this unit which is well known to those skilled in the art. The diagram under consideration has been given merely by way of comparison. Indeed, anyone skilled in the art knows that once a key has been actuated, it initiates a rotational cycle of the corresponding cam and triggers a matrix.

It is to be noted that the time of action of the cam, taking into account the normal speed of rotation for roller 7 in conventional "Linotype" machines, is decided by the profile of the active surface 6*b* (FIG. 3) of the cam. This active surface represents approximately one half of the cam's total perimeter. The mean active time being, as explained hereabove, of 1/10 of a second in conventional "Linotype" machines, the total duration of the rotation of a cam can be estimated as lasting about one fifth of a second. This gives a velocity of angular rotation of the cam, and hence of the rotating roller driving the cam, since they are approximately of the same diameter, of 300 turns per minute, this value corresponding to the angular velocity range normally associated with conventional "Linotype" machines. It is to be noted that the active run of the cam in accordance with the invention is based on the normal dimensions and velocities of rotation to be found in a conventional "Linotype" machine, any change in the gear ratio of roller to cam and/or angular velocity of rotation of roller and/or dimensions of one or other or both the roller and cam having a calculable and therefore easily predictable effect on the length of active run of the cam designed in accordance with the invention to maintain the duration of activity desired. Further calculation on the conventional cam shows that the effective time of action of the cam is dependent on a run over this latter of approximately 180°.

Figure 2:
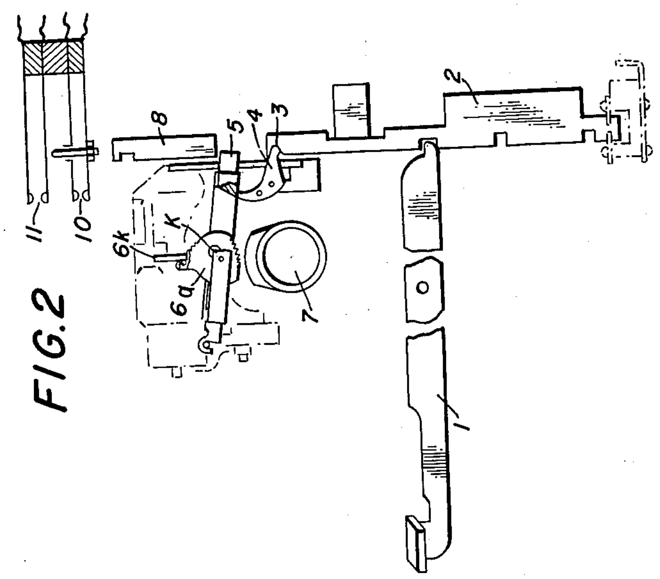
FIGURE 2 is a view of the corresponding unit modified in accordance with the invention.
Figure 3:
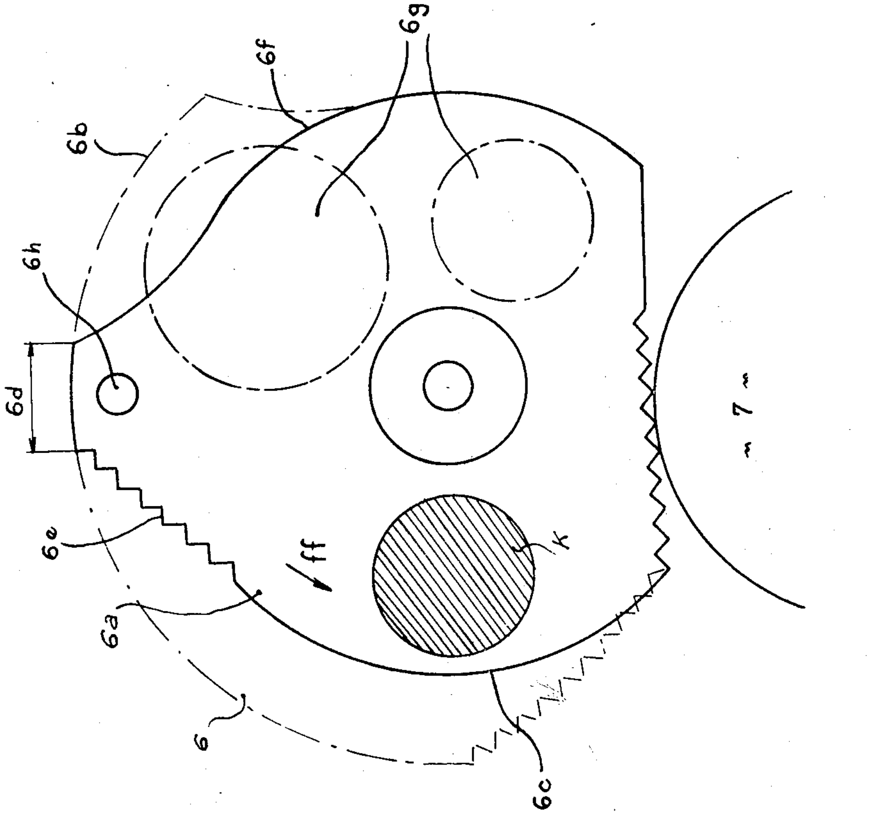
FIGURE 3 is the profile of a cam modified in accordance with the invention (full lines) the parts of a conventional cam which have been eliminated being shown in chain-dotted lines.

Referring now to FIGURE 2, wherein a different type of cam 6*a* is used, being loaded at K and having a profile corresponding to that shown in full lines by way of example in FIGURE 3 (the profile of those parts of a conventional cam which no longer apply being shown in this same figure in chain-dotted lines), the linkage 8*a*—8*b* controlling the escapement of the matrices is replaced by electric contacts 10 and 11; the electric contacts 10 are located in the supply circuit for the punching unit which will be described hereafter, and the contacts 11 are located in the supply circuit for the "counting" device, which is not described in connection with the present invention.

As concerns the specific profile of the cam in accordance with the invention, this has been designed so as to obtain, as indicated above, a response time corresponding to an active run on the cam of between 3 milliseconds and 1/30 of a second. By calculation, in adapting approximately 1/10 of a second for an active angular run of 180°, it is possible to evaluate corresponding angles for periods of time ranging between 3 milliseconds and 1/30 of a second. This gives an active angular path of between 5.4° and 60°. In other words, the active angular path of the cam in accordance with the invention must lie between 5.4° and 60°. The applicant has advantageously selected an active angular run of 18° (6*d*) which corresponds to an active response time of 1/100 of a second, which time is amply sufficient for the purposes in hand.

FIGURE 3 shows a practically advantageous form of embodiment of the cam in accordance with the invention (shown in continuous lines). This form of embodiment comprises, following the cam's profile through one cycle of rotation in the direction of arrow *ff*, ramps in contact with roller 7 which are non-active, i.e., do not lead to any action on the electric contacts. These are the ramps 6*c* and 6*e* which are adapted to lead yoke 5, on rotation of the cam, to its upper maximum position, thereby allowing electric contact. The start of this upper maximum position corresponds to the start of run 6*d*. The stepped portion 6*e* serves to increase the friction necessary for turning the cam until the run 6*d* is reached. The yoke 5 stays in its upper maximum position during the run along 6*d*. This yoke then starts to descend, cutting electric contact, when roller 7 runs along the portion 6*f* of the cam until it regains its lower minimum position from whence it started. In order to aid the cam in its rotation, a ballast weight K is advantageously provided as indicated. It is to be noted that, by contrast, the conventional cam has openings 6*g* which lighten one side of the cam with the same object of assisting its rotation, but these openings would present mechanical and constructive difficulties in the cam according to the invention. Also provided at the high point of the cam in accordance with the invention is a conventional cam pin 6*h* co-operating in the usual manner with the retaining pawl 6*k* existing on a conventional "Linotype" machine.

As regards the code used for the perforations, it will be understood mathematically that, in the case of "*n*" punches, the number of combinations of perforations, each corresponding to a different sign, is represented symbolically by the formula:

$$\sum_{C_1^n}^{C_n^n} = C_1^n + C_2^n + C_3^n + \dots + C_r^n + \dots + C_{n-2}^n + C_{n-1}^n + C_n^n$$

which formula can be better expressed for calculation purposes as:

$$\sum_{\frac{n!}{1!(n-)!}}^{1} = \frac{n!}{1!(n-1)!} + \frac{n!}{2!(n-2)!} + \frac{n!}{3!(n-3)!} + \cdots + \frac{n!}{r!(n-r)!} + \cdots \frac{n!}{(n-2)!2!} + \frac{n!}{(n-1)!1!} + 1$$

conventional mathematical symbols being used, e.g., $\Sigma$=the summation of; $C_r^n$=the combination of "*n*" things taken "*r*" at a time; !=factorial.

Knowing that the keyboard of a conventional "Linotype" machine comprises at least 91 keys, it is, therefore, necessary to select a code wherein the number of punches enables more than 90 different arrangements of perforations to be effected. To this end, the applicant has advantageously selected a seven-punch code, each of the seven punches being adapted to be actuated selectively, according to the invention, by an electromagnet. With a seven-punch code each sign can be represented by a certain number of perforations comprised between one and seven using every possible combination. By substituting $n=7$ in either one of the above formulae, it is found that a 7-punch code allows 127 different symbols to be used wherein at least one punch is used. Of course, one symbol may be added to this total for including the case where no punches are used and therefore no perforations are produced on depressing the key corresponding to this particular symbol.

Figure 4:
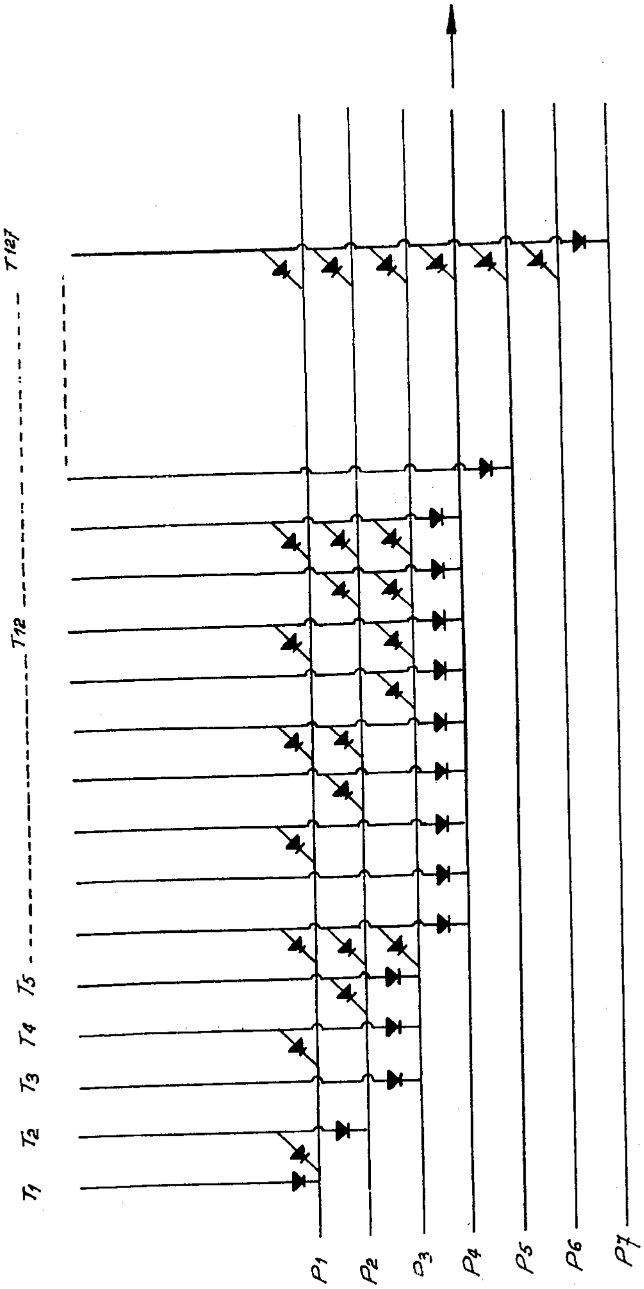
FIGURE 4 is a diagram of the electrical circuit of the so-called "code-distributing" type, cooperating with the unit shown in FIGURE 2.

In FIGURE 4 is shown a part of the electrical circuit for the punching unit, this circuit being called the "code-distributor" diagram.

On this code-distributing diagram, each key or sign has been numbered from 1 to 127 (references $T_1$ to $T_{127}$). This is of course for purposes of illustration as any number of keys between 91 and 128 may be used in accordance with the explanations set out above. Selecting 127 keys demonstrates the full use of the seven punches. The connecting circuit for the seven electromagnets have also been indicated by the references $P_1$ to $P_7$. It will be readily understood with reference to this figure that, in order to respect the code corresponding to each key or sign, each circuit corresponding to a key or sign has to be unidirectional, with no risk of deviation of current through another circuit. It is for this reason that the circuits corresponding to each key or sign are provided with electric rectifiers such as electronic valves allowing the current to pass in one direction only. These valves are indicated by the conventional sign for a valve rectifier, i.e. a sign having the shape of an arrow. This arrow points in the direction of conventional current flow, i.e. in the opposite direction to that of electronic current flow, said valves being of the diode rectifier type.

Taking as an example one key or sign, such as $T_{12}$, and assuming that the corresponding contact 10 is closed, a D.C. current from an external source (not shown) flows into the circuit $T_{12}$ of the code-distributing diagram (FIGURE 4). If the circuit $T_{12}$ is connected, as shown, to the lines $P_1$, $P_3$ and $P_4$, the current flows in the direction of the arrows towards the corresponding electromagnets (not shown), along an electrical circuit which will be described hereunder with reference to FIGURE 5.

It is to be noted straight away that, due to the presence of valves, the currents established cannot flow through other lines to unduly energise other electromagnets which do not correspond to the punches giving the perforation code established for the sign of key $T_{12}$. The same reasoning can be applied for each of the signs of keys $T_1$–$T_{127}$.

For a tape to be correctly perforated, there must be provided means for guiding, maintaining in position, and advancing the tape. According to the invention, these guides, position-holders, and advancers are electro-mechanical. It is accordingly necessary that each key depressed causes both the tape to be correspondingly perforated and, for instance, one or two additional perforations to be punched in order to guide and advance the tape, and, moreover, that a tape advancing device be put into operation.

Still according to the invention, these guiding and advancing means for the tape comprise electromagnets acting on appropriate mechanical members, which will be described hereafter.

Figure 5:
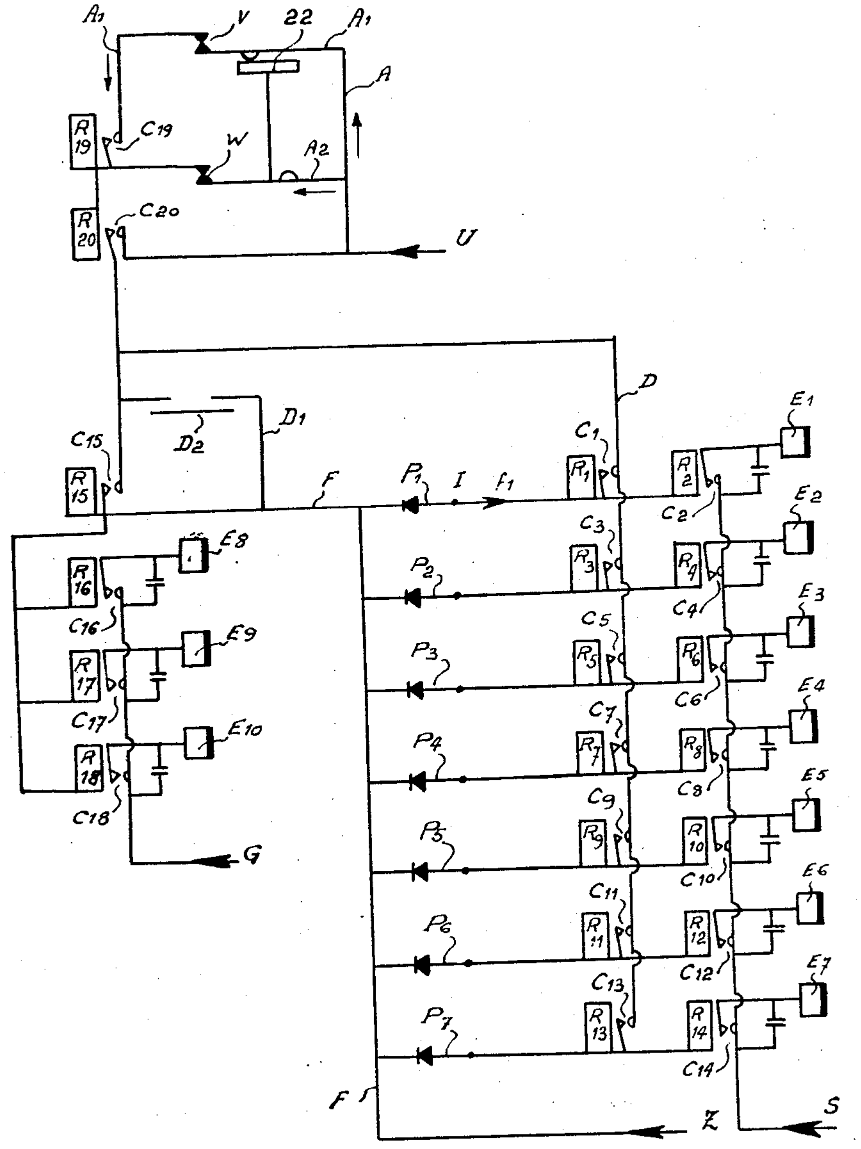
FIGURE 5 is a diagram of the electrical circuit controlling the punching device and the advance of the perforated tape.

Referring to the diagram in FIGURE 5 which will be called the "timer" and referring again to the code distributing diagram, it has been seen that a current flows in the various lines $P_1$–$P_7$ in accordance with the code corresponding to a depressed key. According to the combination under consideration, the current ($P_1$–$P_7$), which will be referred to hereafter as the "signal," causes the energisation of the corresponding electromagnet or electromagnets such as $E_1$, $E_2$, $E_3$ . . . $E_7$. The energisation of this electromagnet or these electromagnets is achieved through a pair of relays such as $R_1$—$R_2$, $R_3$—$R_4$, $R_5$—$R_6$ . . . and an independent supply-circuit S for the electromagnets $E_1$–$E_7$ comprising contacts cooperating with blades $C_2$, $C_4$, $C_6$ . . . , $C_{14}$ operated by the relays $R_2$, $R_4$, . . . $R_{14}$ when the latter are energised and close said contacts. The electromagnet or electromagnets will act to perforate the tape in a manner which will be described hereafter. The first relays $R_1$, $R_3$, $R_5$ . . . $R_{13}$ of the pair of relays $R_1$—$R_2$, $R_3$—$R_4$ . . . are so-called "self-energising" relays whose blades $C_1$, $C_3$, $C_5$ . . . $C_{13}$ are adapted to bear against the corresponding fixed contacts of a line D which is supplied by a secondary current, as will be explained hereafter.

It will be obvious that if a current is admitted, e.g. at I on the line $P_1$, this current will flow in the direction shown by the arrow $f_1$, and will energise the relays $R_1$ and $R_2$; $R_2$ will attract its blade and close the contact $C_2$, thus enabling the source S to feed $E_1$ which causes perforation of the tape as will be described hereafter. The same thing applies for the other electromagnets.

Moreover, lines $P_1$ to $P_7$ include rectifiers, as described above, to preclude any diversion of the current. Whatever be the signal or combination, a current is established in the line F and feeds the relays $R_{15}$, $R_{16}$, $R_{17}$ and $R_{18}$. The relay $R_{15}$ is also a self-energising relay, its blade $C_{15}$ allowing the establishment of contact with line D. This contact $C_{15}$ enables the coils of the relays $R_{16}$, $R_{17}$ and $R_{18}$ to be fed. The excitation of these coils causes the electromagnets $E_8$, $E_9$ and $E_{10}$ to be energised through the blades and the contacts $C_{16}$, $C_{17}$ and $C_{18}$, which electromagnets are adapted, as will be seen, to effect the guiding perforation and advance of the tape.

Referring again to the line D, this can be supplied by a secondary D.C. low amperage arriving at U. Even although the electromagnets $E_1$ to $E_{10}$ are de-energised after the brief passage of the signal, the current from U can flow into an auxiliary circuit A branching at $A_1$ and $A_2$ to supply the relays $R_{19}$ and $R_{20}$, through blade-springs and contacts V and W. The relay $R_{19}$ is energised and holds the contact $C_{19}$ closed. The coil of relay $R_{20}$ is energised and closes the contact $C_{20}$ which feeds the so-called self-energising circuit D of the relays $R_1$, $R_3$, $R_5$ . . . $R_{13}$ as well as $R_{15}$.

The energisation of the electromagnets $E_8$ to $E_{10}$ is effected in a way similar to that for the electromagnets $E_1$ to $E_7$ due to an external independent source supplying the circuit G comprising contacts $C_{16}$, $C_{17}$ and $C_{18}$ adapted to be closed by the corresponding blades of the relays $R_{16}$, $R_{17}$ and $R_{18}$ when these latter are energised.

The electromagnet $E_8$ is designed so as to be capable of acting on the contacts V and W upon displacement of its plunger.

No matter what signal, this electromagnet is as has already been mentioned, energised following the energisation of the relay $R_{16}$ which closes the contact $C_{16}$, and its plunger opens the contact V on retracting. Accordingly, the current no longer passes into the branch $A_1$; however, prior to the opening of contact W, the current continues to flow along $A_2$, and relay $R_{19}$ is still energised. At the end of the stroke of the plunger the contact W is open, which cuts-off the energisation of the relays $R_{19}$, $R_{20}$, $R_{15}$, $R_{16}$, $R_{17}$ and $R_{18}$, as well as of the relays $R_1$, $R_3$, $R_5$ . . . $R_{13}$, which had been energised in accordance with the combination corresponding to the signal passing through the corresponding lines $P_1$ to $P_7$. Since the relay $R_{16}$ is no longer energised in common with the corresponding electromagnet $E_8$, the plunger of this latter is returned to its initial position, having advanced the tape as will be seen hereafter, and the cycle can recommence.

It will be understood that the duration of the signal transmitted through the lines $P_1$ to $P_7$, which is constant due to the specific outline of the cams, should preferably be less than the working time for the electromagnets.

If it is merely desired to advance the tape step by step without any code perforations, it is sufficient to admit a repetitive electric signal at Z, and the device operates as disclosed above.

If it is desired to have a continuous advance signal, it suffices to close the auxiliary circuit $D_1$, by the contact $D_2$, which will energise the electromagnet $E_8$, whose electric response will be the same as previously, but in a continuous manner.

Figure 6:
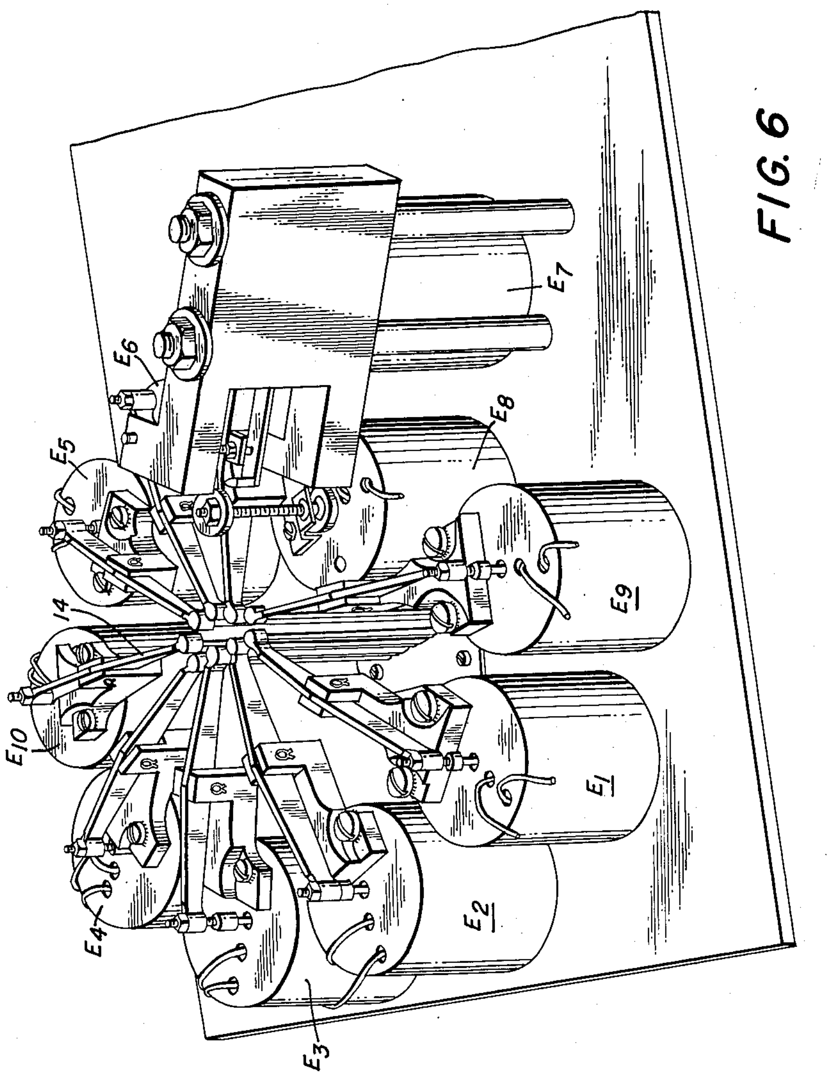
FIGURE 6 is a perspective view of the electromagnets acting on the punching device.
Figure 7:
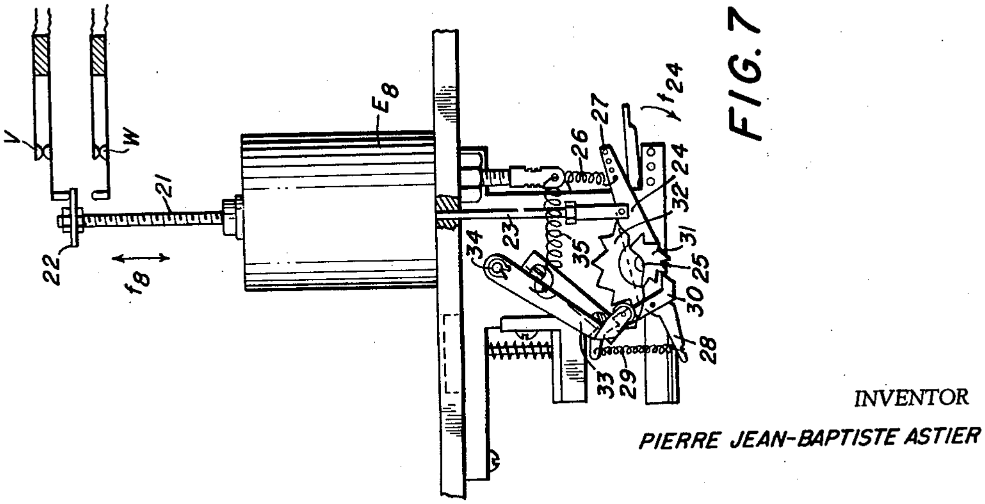
FIGURE 7 is a plan view of the device for advancing the tape.

There will now be described the mechanical device itself as used for perforating the tapes in conjunction with the electrical circuits hereabove described. This description is given with reference to FIGURES 6 to 8. In FIGURE 6 there is a general view of the assembly comprising electromagnets $E_1$ to $E_{10}$; each of these electromagnets, except for $E_8$, cooperates with the punching devices proper in the manner as will be presently described.

As shown in this figure, these electromagnets are distributed in a substantially circular pattern and the punching device proper is located in the central region of this circular assembly.

Figure 8:
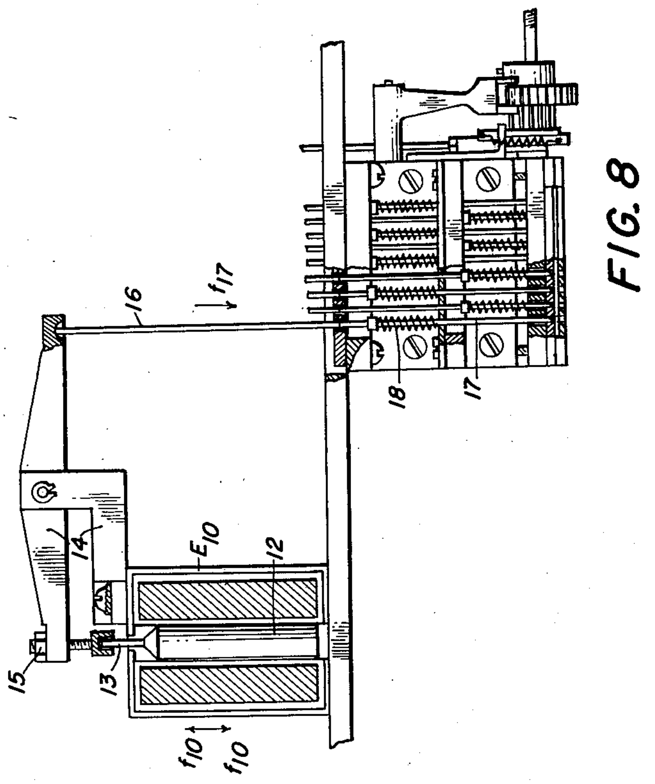
FIGURE 8 is a corresponding view of the punching device proper.

One of the electromagnets, $E_{10}$, has been shown by way of example in greater detail in FIGURE 8. It will be understood that all of the other electromagnets except for $E_8$, are designed in the same manner as electromagnet $E_{10}$ of FIGURE 8 and likewise cooperate in the same manner with their corresponding punching devices.

The electromagnet $E_{10}$ comprises a plunger cylinder 12 capable, on energisation of this electromagnet and de-energisation, of moving in the directions of double-arrow $f_{10}$. This plunger 12 is extended, at its upper portion, by a small rod 13 capable of acting on a unit such as a tumbler 14 provided with its regulating device 15. The end of each tumbler is connected to a swivel-rod 16 acting on a guided punch 17 which operates against the action of a spring 18.

The diametrically opposed electromagnets $E_{10}$ and $E_9$ are adapted to perforate the guiding holes in the paper tape; these guiding perforations are adapted to cooperate with teeth or spikes formed on small toothed wheels or on a cylinder 19 (FIGURE 9) which is provided with spikes or small teeth 20.

The foregoing description of the electrical circuits having shown how the various electromagnets are energised, it will accordingly be obvious that on the energisation of one particular electromagnet, such as $E_{10}$, the plunger 12 is attracted upwards; it acts on the tumbler 14 and urges the corresponding punch 17 in the direction of arrow $f_{17}$. The spring 18 associated with each punch returns the latter to its initial position once the perforation has been made and the electromagnet has been de-energised. Owing to the particular electrical arrangement, the signal is very brief and the energisation of the electromagnets stops in a very short time.

For advancing the paper tape (FIGURE 7), there is provided an electromagnet $E_8$ with a rod 21 connected to its plunger; this rod carries at its upper part a device 22 enabling the opening or closing of the contacts V and W, as has been described above.

The plunger of electromagnet $E_8$ is extended at its lower portion by a rod 23 mounted to articulate on a small lever-arm 24 which can pivot about a pin 25 against a return spring 26 by one of its extremities 27. At its other extremity 28 there is connected a spring 29 acting on a pawl 30 which cooperates with a ratchet wheel 31 keyed on the same shaft as a second ratching wheel 32 and as the cylinder 19 (FIGURE 9) provided with its teeth to which reference has already been made. The ratchet wheel 32 cooperates with a roller-pawl 33 whose axis of articulation is designated by the reference numerial 34; this pawl 33 is biased against the ratchet wheel 32 by a spring 35.

This device operates as follows: When the plunger of the electromagnet $E_8$ is attracted downwards ($f_8$), the rod 23 causes the lever arm 24 to be pivoted in the direction of arrow $f_{24}$, thus obliging the pawl 30 to recede and engage with the tooth immediately preceding the tooth of the wheel 31 with which it was in engagement. When the rod 23 resumes its upper position, the lever arm 27 returns to its position and the pawl 30 causes the wheel 31 to advance, thus rotating the cylinder 19 and advancing the tape by a corresponding length; the pawl 33, which cooperates with the wheel 32, serves to maintain the assembly in position.

It will be noted that the pawl 30 can be advantageously articulated to the lever arm 24 in order to allow the possibility of a manual adjustment of the position of the tape when the lever arm 27 is not drawn. This manual adjustment can be carried out with the button M (FIGURE 9).

Figure 9:
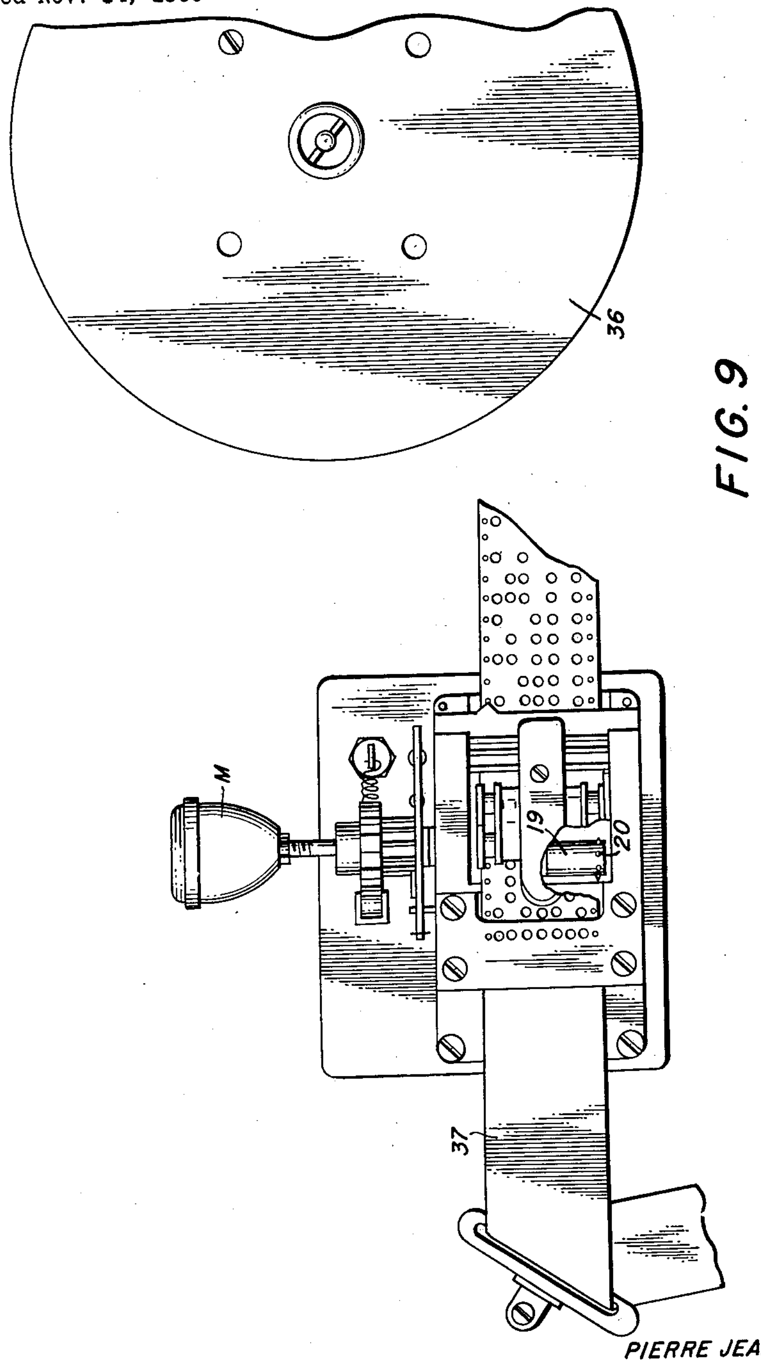
FIGURE 9 is a diagrammatic view of the front elevation of the apparatus embodying the invention.

In FIGURE 9 there is shown diagrammatically the general arrangement for the admission of the tape 37 into the punching device, as well as the possibilities for winding this tape onto a drum 36 which can be rotated by any appropriate means.

I claim:

1. A device for perforating a paper tape comprising a key controlled means for operation of the device, a first electric switch controlled by said key controlled means, an electric distribution network comprising a plurality of distribution lines for each said first electric switch, an electric circuit connected at one extremity to said first electric switch and bearing at its other extremity means for connection to at least one of said plurality of distribution lines in accordance with a selected arrangement corresponding to the key corresponding to said first electric switch for each of the said distribution lines an electromagnetic circuit comprising one first electromagnet, for each said first electromagnet a perforation means controlled by said first electromagnet, an auxiliary circuit operatively associated with said distribution lines; said auxiliary circuit comprising electromagnetic-mechanical means adapted to guide and advance the paper tape including a reciprocating switch device connected to said electric distribution network, a second electromagnet operatively connected with said reciprocating switch device and said distribution network, mechanical linkage between said second electromagnet and said reciprocating switch device comprising a plunger extended at one of its extremities by an upper rod and at its other extremity by a lower rod, the upper extremity of said upper rod including a push rod adapted to act on said reciprocating switch device, said lower rod comprising mechanical means adapted to advance the paper tape on its support, said mechanical means comprising a tape-supporting roller adapted to be driven in rotation about an axle, peripheral teeth distributed on said roller in locations adjacent each of the extremities of said roller support, at one of the extremities of said axle a first ratchet wheel of small diameter and a second ratchet wheel of diameter larger than that of the first said ratchet wheel and coaxial therewith, a pawl adapted to engage with said first ratchet wheel, an articulatedly mounted pawl runner adapted to engage said second ratchet wheel, a spring biasing said pawl runner against said second ratchet wheel, a lever arm articulatedly mounted at the lower extremity of said lower rod, an axle for the pivotal mounting of said lever arm, a first return spring adapted to act on one extremity of said lever arm, and a second return spring mounted between the other extremity of said lever arm and said pawl which cooperates with said first ratchet wheel.

2. A device for perforating a paper tape comprising a key controlled means for operation of the device, said key control means including a ballasted cam, a first electric switch controlled by said key controlled means, an electric distribution network comprising a plurality of distribution lines for each said first electric switch, an electric circuit connected at one extremity to said first electric switch and bearing at its other extremity means for connection to at least one of said plurality of distribution lines in accordance with a selected arrangement corresponding to the key corresponding to said first electric switch, for each of the said distribution lines an electromagnetic circuit comprising one first electromagnet, for each said first electromagnet a perforation means controlled by said first electromagnet, an auxiliary circuit operatively associated with said distribution lines, said auxiliary circuit comprising electromagnetic-mechanical means adapted to guide and advance the paper tape including a reciprocating switch device connected to said electric distribution network, a second electromagnet operatively connected with said reciprocating switch device and said distribution network, mechanical linkage between said second electromagnet and said reciprocating switch device comprising a plunger extended at one of its extremities by an upper rod and at its other extremity by a lower rod, the upper extremity of said upper rod including a push rod adapted to act on said reciprocating switch device, said lower rod comprising mechanical means adapted to advance the paper tape on its support, said mechanical means comprising a tape-supporting roller adapted to be driven in rotation about an axle, peripheral teeth distributed on said roller in locations adjacent each of the extremities of said roller support, at one of the extremities of said axle a first ratchet wheel of small diameter and a second ratchet wheel of diameter larger than that of the first said ratchet wheel and coaxial therewith, a pawl adapted to engage with said first ratchet wheel, an articulatedly mounted pawl runner adapted to engage said second ratchet wheel, a spring biasing said pawl runner against said second ratchet wheel, a lever arm articulatedly mounted at the lower extremity of said lower rod, an axle for the pivotal mounting of said lever arm, a first return spring adapted to act on one extremity of said lever arm, and a second return spring mounted between the other extremity of said lever arm and said pawl which cooperates with said first ratchet wheel.

3. A device for perforating a paper tape comprising a plurality of perforating means for punching holes in the paper tape, individual electromagnetic means to move each of said perforating means as required, additional electromagnetic means for advancing the paper tape in timed relationship with said perforating means, a keyboard, and key controlled means for operating said individual electromagnetic means, said key controlled means including a counter-weight mounted at one extremity of said key controlled means, a bank at the upper extremity of said counter-weight, a trigger adapted to engage with said bank, a yoke adapted to be supported by said trigger, a rotating cam of peripheral portion projecting over an angular distance within the range of 5.4° to 60° in said yoke, articulation means adapted to enable said yoke to swing in one plane, a roller mounted and driven to rotate continuously and regularly and located adjacent to said cam, said cam being adapted to come into contact with said roller upon articulation of said yoke, and a linkage adapted to cooperate with said yoke for displacement in said plane and further including an electrical switching means controlled by said linkage whereby said electrical switching means operates one of said individual electromagnetic means which in turn operates a corresponding one of said perforating means.

References Cited in the file of this patent

UNITED STATES PATENTS

| | | |
|---|---|---|
| 1,185,384 | Druitt et al. | May 30, 1916 |
| 1,315,277 | Boddiker | Sept. 9, 1919 |
| 2,079,196 | Albrecht | May 4, 1937 |
| 2,095,006 | Paine | Oct. 5, 1937 |
| 2,390,413 | Ayres | Dec. 4, 1945 |
| 2,543,435 | Buckley | Feb. 27, 1951 |
| 2,700,421 | Blodgett | Jan. 25, 1955 |
| 2,784,785 | Dotz | Mar. 12, 1957 |
| 2,816,609 | Rossetto et al. | Dec. 17, 1957 |
| 3,014,644 | Clay | Dec. 26, 1961 |